(12) United States Patent
Turner

(10) Patent No.: US 11,383,745 B2
(45) Date of Patent: Jul. 12, 2022

(54) TROLLEY

(71) Applicant: ROLLAPOLE LIMITED, Newcastle Upon Tyne (GB)

(72) Inventor: Andrew Turner, Newcastle Upon Tyne (GB)

(73) Assignee: ROLLAPOLE LIMITED

( * ) Notice: Subject to any disclaimer, the term of this patent is extended or adjusted under 35 U.S.C. 154(b) by 0 days.

(21) Appl. No.: 17/042,562

(22) PCT Filed: Mar. 28, 2019

(86) PCT No.: PCT/GB2019/000055
§ 371 (c)(1),
(2) Date: Sep. 28, 2020

(87) PCT Pub. No.: WO2019/186094
PCT Pub. Date: Oct. 3, 2019

(65) Prior Publication Data
US 2021/0031820 A1    Feb. 4, 2021

(30) Foreign Application Priority Data

Mar. 28, 2018 (GB) ..................... 1805112

(51) Int. Cl.
*B62B 3/02* (2006.01)
*B62B 3/18* (2006.01)
(Continued)

(52) U.S. Cl.
CPC ............... *B62B 3/02* (2013.01); *B62B 3/002* (2013.01); *B62B 3/1476* (2013.01); *B62B 3/18* (2013.01)

(58) Field of Classification Search
CPC ......... B62B 3/02; B62B 3/002; B62B 3/1476; B62B 3/18; B62B 3/025; B62B 3/027; A47B 43/00; A47B 43/003; A47B 43/04
See application file for complete search history.

(56) References Cited

U.S. PATENT DOCUMENTS 3,197,224 A * 7/1965 Kappen ................. B62B 3/1476
280/33.996
3,698,733 A * 10/1972 Isaacs ..................... B62B 3/002
280/33.998
(Continued)

FOREIGN PATENT DOCUMENTS

AT            11917 U1     7/2011
DE    202004006463 U1     6/2004
(Continued)

OTHER PUBLICATIONS

International Search Report and Written Opinion from corresponding Application PCT/GB2019/000055 dated Jul. 29, 2019, pp. 1-11.

*Primary Examiner* — John D Walters
(74) *Attorney, Agent, or Firm* — The Belles Group, P.C.

(57) ABSTRACT

A trolley (10), primarily for use as a roll cage, includes a base (16) with wheels (18) and a frame (40) located above said base (16). Poles (28, 30, 32, 34) are used to join the frame to the base and a flexible member (14) such as a tarpaulin sheet with latching clamps or a ratchet strap, are used to create tension between the components, to ensure the integrity of the trolley and to reduce the generation of noise when the trolleys is moving in use.

20 Claims, 8 Drawing Sheets

(51) Int. Cl.
　　　*B62B 3/00*　　　(2006.01)
　　　*B62B 3/14*　　　(2006.01)

(56) References Cited

U.S. PATENT DOCUMENTS

| | | | | |
|---|---|---|---|---|
| 4,346,906 | A * | 8/1982 | Thorpe | B62B 3/186 |
| | | | | 280/33.996 |
| 7,546,667 | B2 * | 6/2009 | Yang | A44B 11/006 |
| | | | | 24/200 |
| 7,806,426 | B2 * | 10/2010 | Van Landingham, Jr | |
| | | | | B62B 3/02 |
| | | | | 280/47.35 |
| 8,998,246 | B2 * | 4/2015 | Griffard | B62B 3/007 |
| | | | | 280/651 |
| 2011/0031200 | A1 * | 2/2011 | Chen | A47B 43/00 |
| | | | | 211/149 |

FOREIGN PATENT DOCUMENTS

| | | |
|---|---|---|
| DE | 202014102603 U1 | 8/2014 |
| DE | 202017106104 U1 | 10/2017 |
| WO | WO2014/009594 A1 | 1/2014 |

* cited by examiner

TROLLEY

CROSS-REFERENCE TO RELATED PATENT APPLICATIONS

The present application is a U.S. national stage application under 35 U.S.C. § 371 of PCT Application No. PCT/GB2019/000055, filed Mar. 28, 2019, which claims priority to United Kingdom Patent Application No. 1805112.8, filed Mar. 28, 2018. The disclosures of the aforementioned priority applications are incorporated herein by reference in their entireties.

The present invention relates to a trolley and relates particularly, but not exclusively, to a roll cage used in the distribution of goods to retailers.

The use of specialist caged trolleys, known as "roll cages", to assist in the transportation of goods to retailers, is well known. The roll cages have a base, which is approximately square with 1 m×1 m dimensions, with castor wheels. Metal mesh sides are provided which create a trolley which is taller than it is wide and which can be filled with pre-packaged goods for redistribution to the shelves of a retailer. The roll cage is typically made entirely from metal with rigid mesh side panels locking together to form the rigid structure which retains the goods inside. The construction from metal and slot together arrangement, which allows the roll cage sides to be collapsed to facilitate stacking or nesting of the trolleys together when empty, inevitably results in parts of the roll cage rattling when moved. This is a particular problem where goods are being delivered to a retailer out of normal working hours in a mixed retail and housing area. This has resulted in retailers being unable to accept deliveries at certain times of day.

Furthermore, the metal construction results in a heavyweight product adding to the cost of transportation. The metal construction also makes the roll cages vulnerable to corrosion, making them unsuitable for or undesirable to use within the retail environment. Furthermore, damage to the metal components, particularly the mesh as the weakest and most vulnerable of the metalwork, can result in operator injury.

It is becoming increasingly commonplace for goods to be displayed in roll cages by retailers to avoid double handling, that is, the need for retail staff to transfer goods from the roll cage to the retail shelves. However, to remove this need for double handing and allow goods to be displayed in a roll cage requires aesthetically acceptable roll cages to be provided. It is also the case that the roll cages are difficult to clean making them vulnerable to dirt traps and potential soiling or contamination of the goods they are carrying.

Preferred embodiments of the present invention seek to overcome or alleviate the above described disadvantages of the prior art.

According to an aspect of the present invention there is provided a trolley comprising:

a base having a plurality of wheels attached thereto;
a frame in use located above said base;
at least one connector in use joining said frame to said base; and
at least one flexible member attached to and connecting a plurality of components from said base, said frame and at least one of said at least one connector and thereby creating tension between said connected components.

By using a flexible member to create tension between a plurality of the components, for example, between the base and the frame or between adjacent connectors, the advantage is provided that the tension so created facilitates a structural integrity for the roll cage as well as preventing the components from rattling. Furthermore, by removing the metallic sides from the roll cage and replacing them with flexible material, such as tarpaulin, the weight of the roll cage is reduced, in turn reducing the overall transportation cost for retailers and goods distributors.

In a preferred embodiment the flexible member comprises at least one sheet material in use extending between a plurality of said components.

Using a sheet or fabric material allows the roll cage to be printed on, thereby allowing identifying livery (words, logos and colours) to be used and the roll cages can be easily identified as being those of a particular retailer. This also allows the roll cages to be used more within the retail store providing matching livery for the retailer. Furthermore, the fabric material allows visible safety and hygiene information to be printed onto the trolley and such fabrics can be easily cleaned.

In another preferred embodiment the components between which said sheet material extends comprise connectors.

The trolley may further comprise a clamp for fixing said flexible member to a said component and creating tension between said component and another component connected via said flexible member.

In a preferred embodiment the clamp comprises a tensioning clamp.

In another preferred embodiment the flexible member and said clamp comprise a ratchet strap.

By using clamps, for example, tensioning clamps or ratchet straps, the advantage is provided that tension can be exerted between the base and the frame, including extending through the flexible member where it is a sheet material, to pull both the base and the frame into engagement with the connectors, thereby creating a rigid structure. At the same time, this structure can be collapsed and dismantled for easy transportation.

In a further preferred embodiment the at least one connector comprises at least one pole.

The use of poles allows for the cage to be easily assembled and disassembled.

In a preferred embodiment the at least one connector is fixed to said base and said frame.

In a preferred embodiment the at least one connector is removably connected in use to said base and said frame.

In another preferred embodiment the connector comprise a pair of fixed connectors and a pair of removable connectors.

In a further preferred embodiment the connectors are attached to said flexible member.

By providing a pair of fixed connectors and a pair of movable connectors, the advantage is provided that the roll cage can be collapsed so that the trolleys can be stacked or nested together in a manner akin to that used with the metal roll cages of the prior art.

In a preferred embodiment the frame comprises a first foldable portion pivotable through substantially 90° from a working condition to a storage condition.

The frame may further comprises a first fixed portion attached to said connector with said first foldable portion being capable of pivoting relative to said fixed portion.

In another preferred embodiment the base comprises a second foldable portion pivotable through substantially 90° from a working condition to a storage condition.

The base may further comprises a second fixed portion attached to said connector with said second foldable portion being capable of pivoting relative to said fixed portion.

By having either a base or a frame or both components able to pivot provides an easy to operate mechanism for assembling and disassembling the roll cage between the working and storage conditions.

In a preferred embodiment the connection between at least one connector and at least one of said base and said frame comprises a cam surface which causes said connector to move in a direction when said connector and said base or frame are brought together to apply said attention to said flexible member.

In another preferred embodiment the cam surface comprises an at least partially conical surface formed on a surface of said connection.

By using a cam surface, and in particular a conical surface, the advantage is provided that the action of assembling the trolley, specifically the engagement of the connectors with the base and frame, causes the tensioning of the flexible member, thereby creating the required structural integrity for the roll cage.

According to another aspect of the present invention there is provided a trolley comprising:
a base having a plurality of wheels attached thereto;
a frame in use located above said base;
at least one removable connector in use joining said frame to said base; and
at least one flexible member attached to and connecting to at least one of said base, said frame and said at least one connector.

Preferred embodiments of the present invention will now be described, by way of example only, and not in any limitative sense with reference to the accompanying drawings in which.

Figure 1:
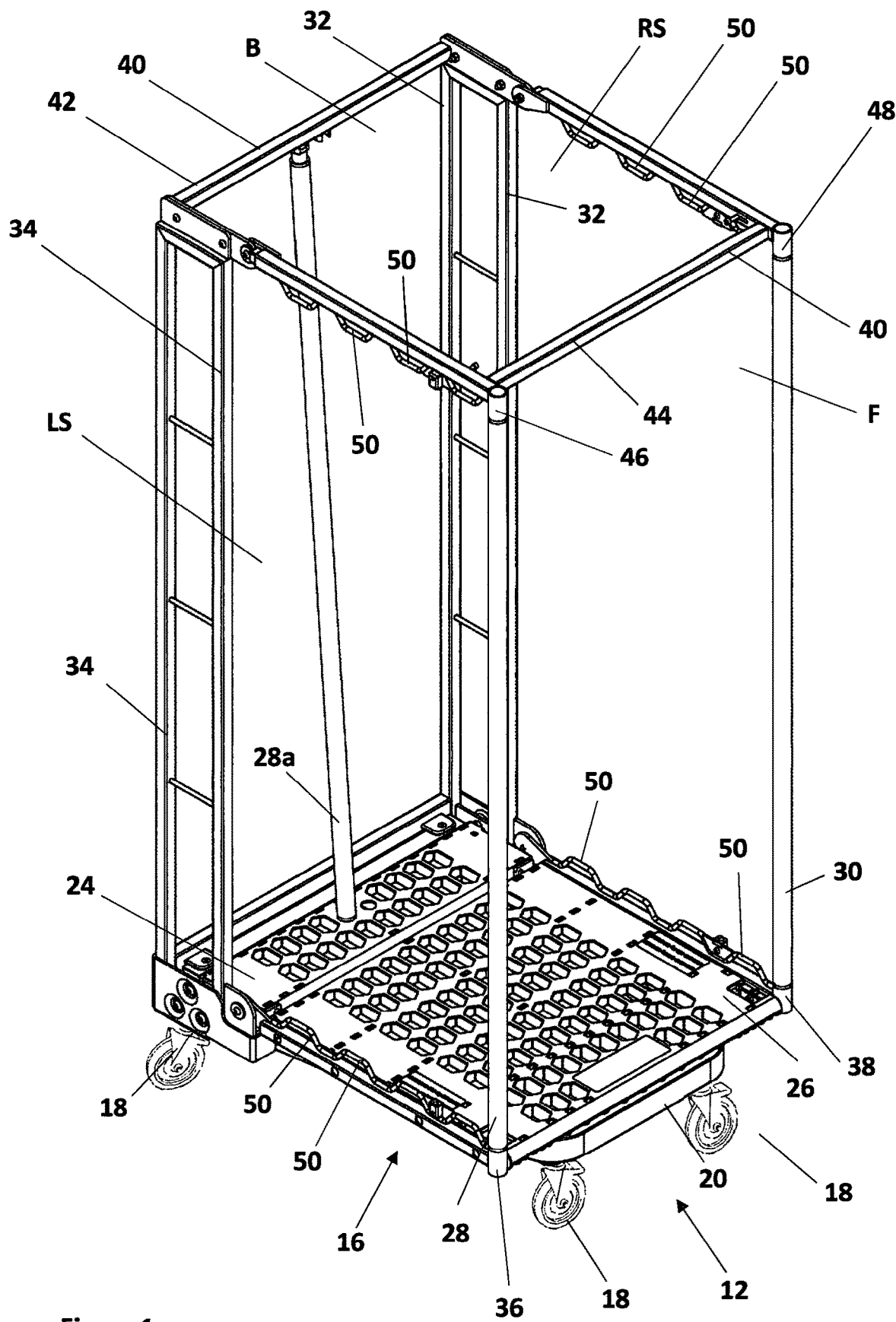
FIG. 1 is a perspective view of a portion of a first embodiment of the present invention.
Figure 3:
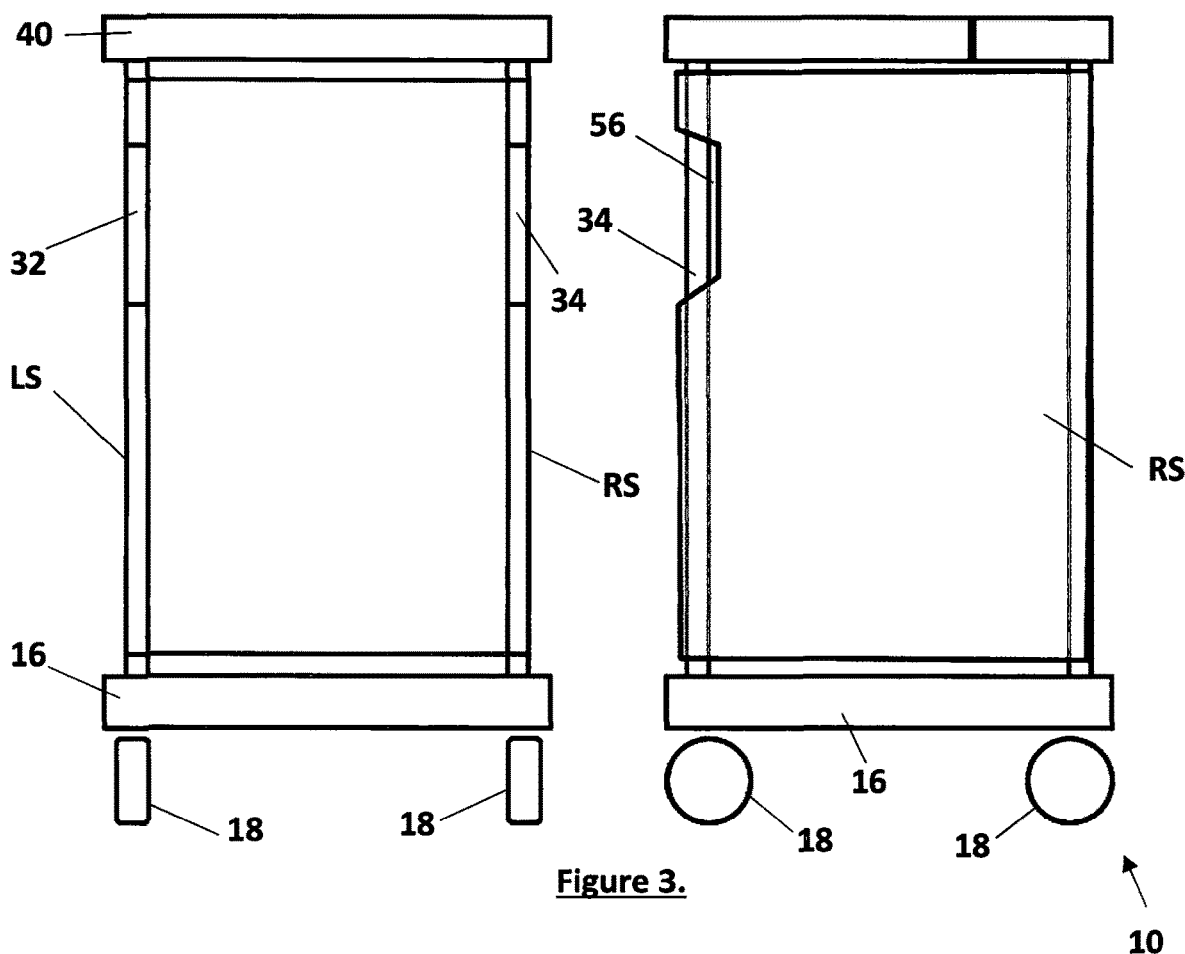
Figure 4:
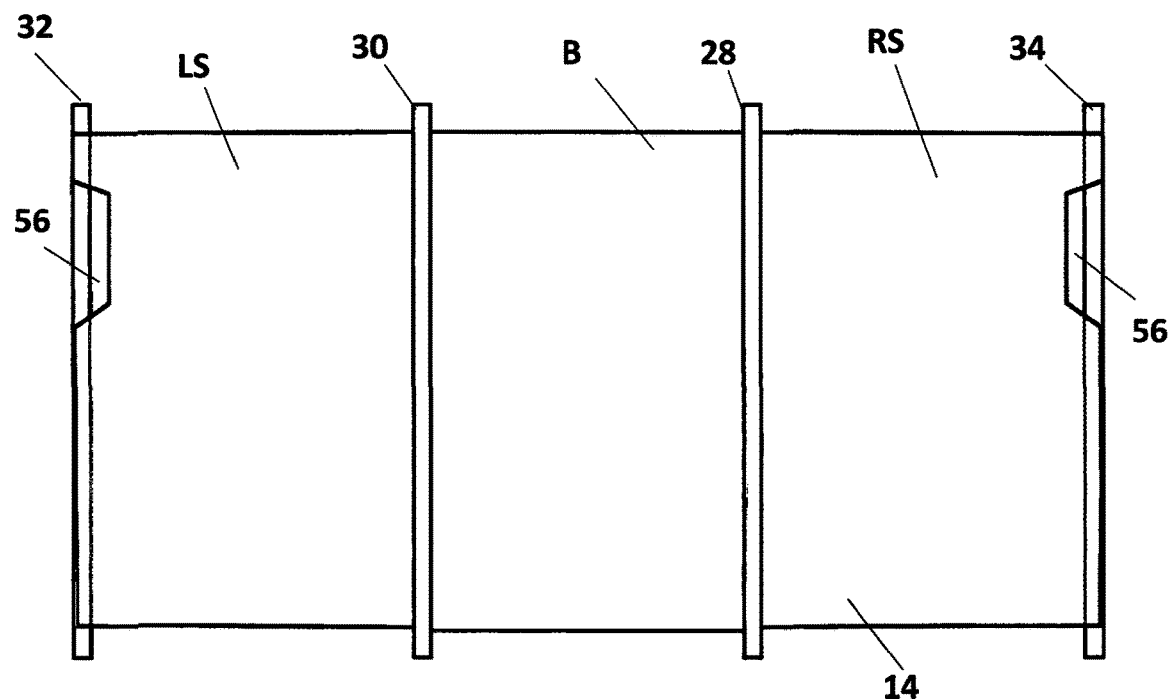
Figure 5:
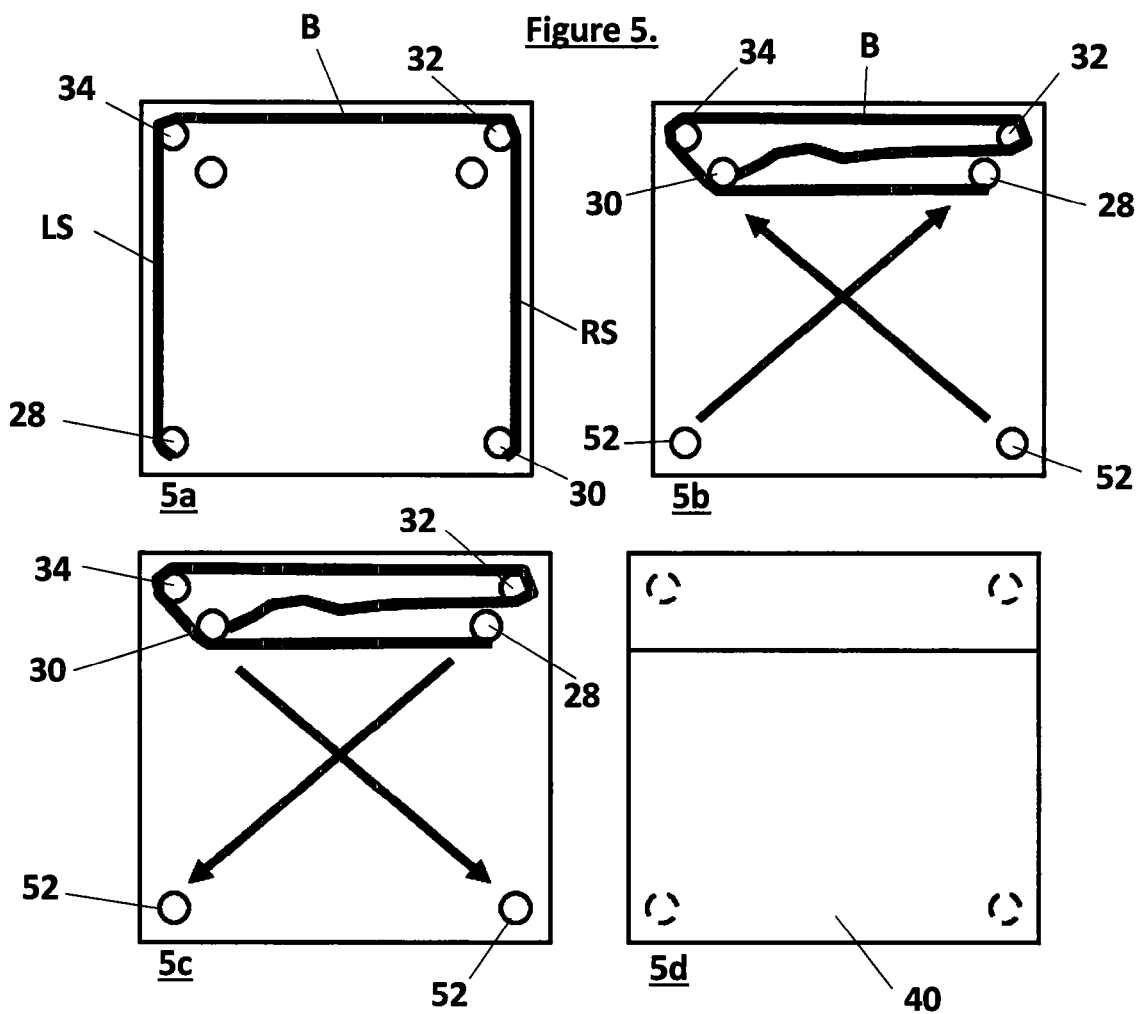
Figure 6:
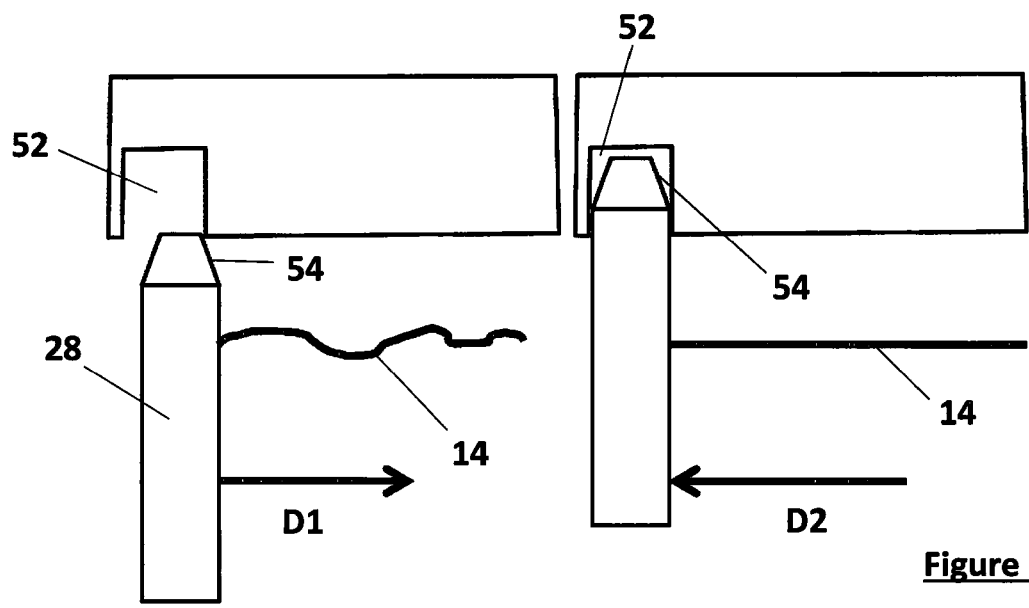
Figure 7:
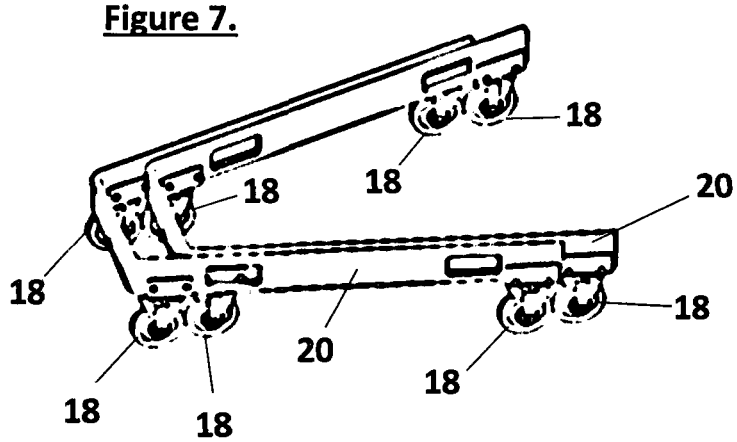
Figure 8:
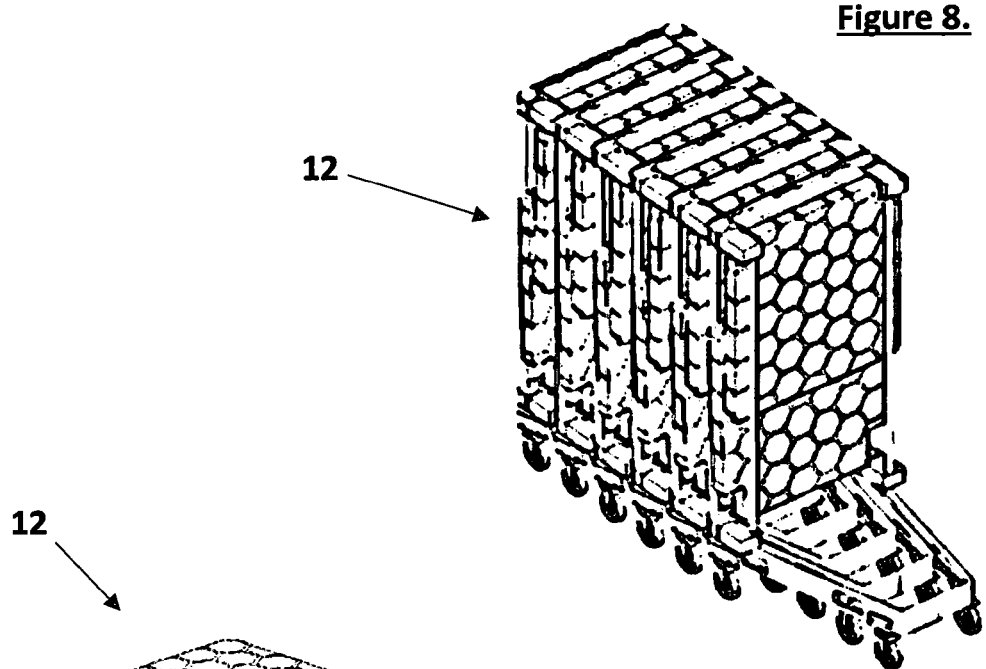
Figure 9:
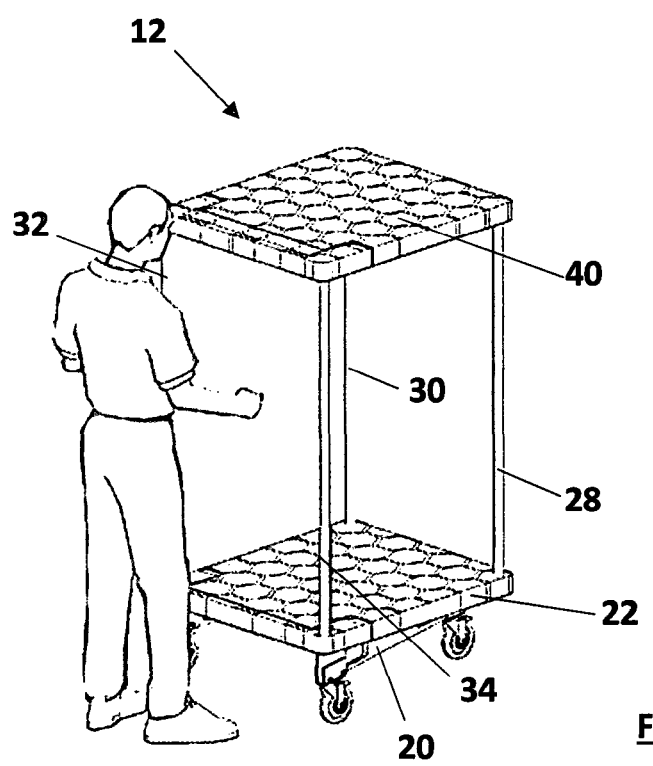
Figure 10:
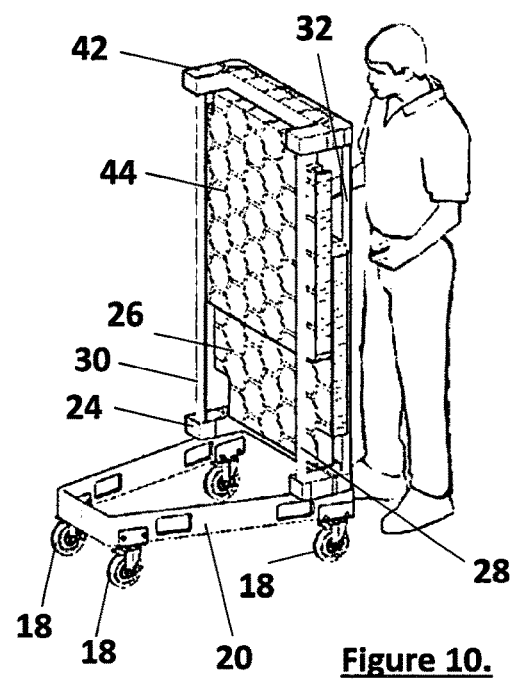
Figure 11:
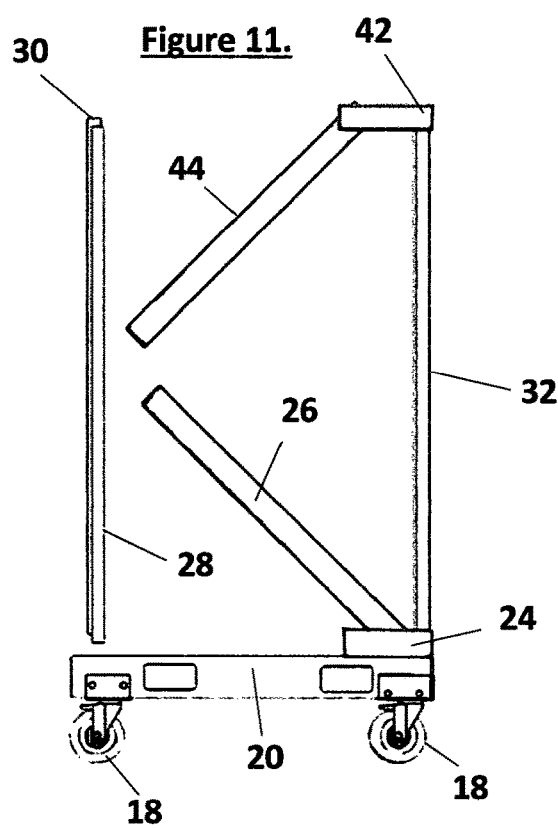
Figure 12:
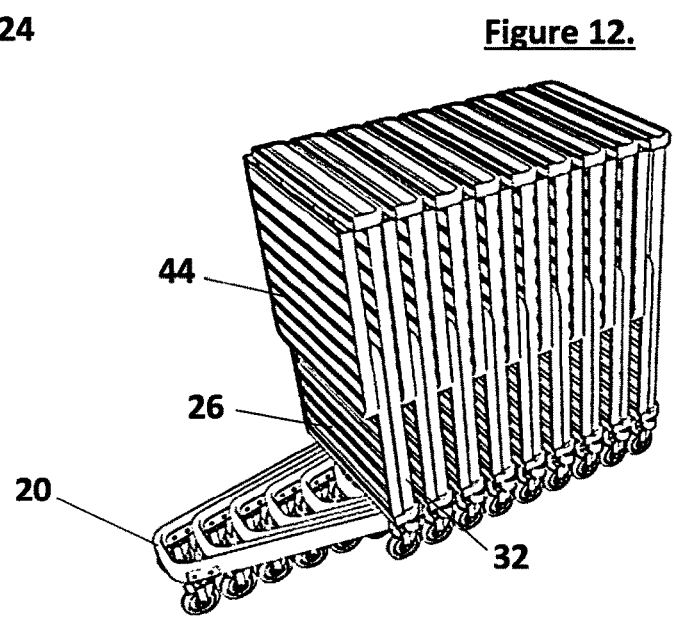
Figure 13:
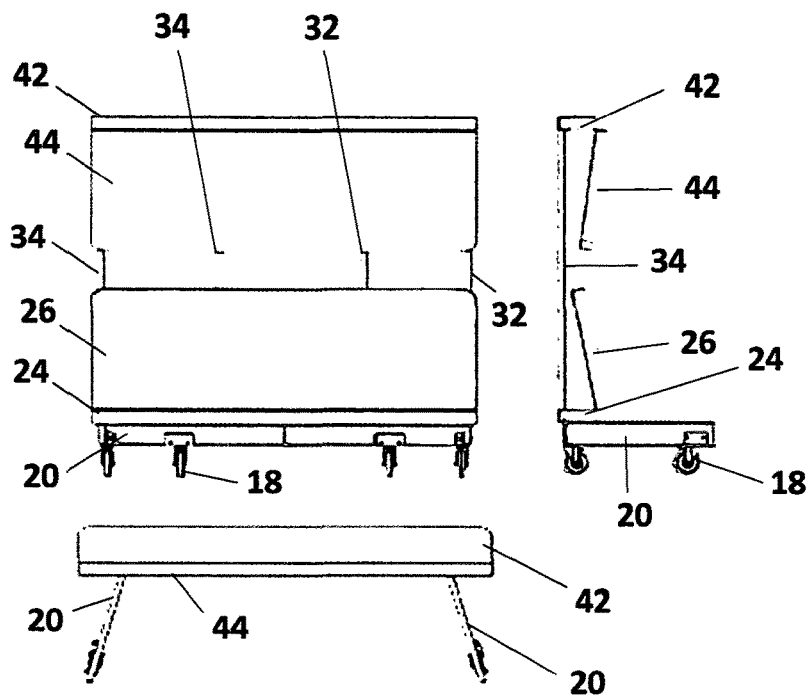
Figure 14:
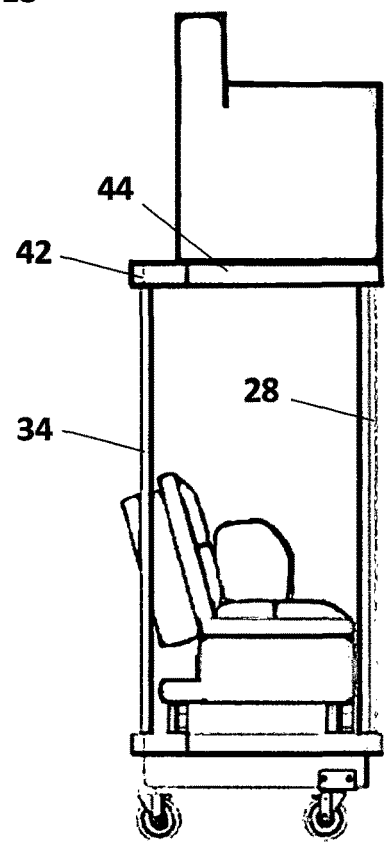
Figure 15:
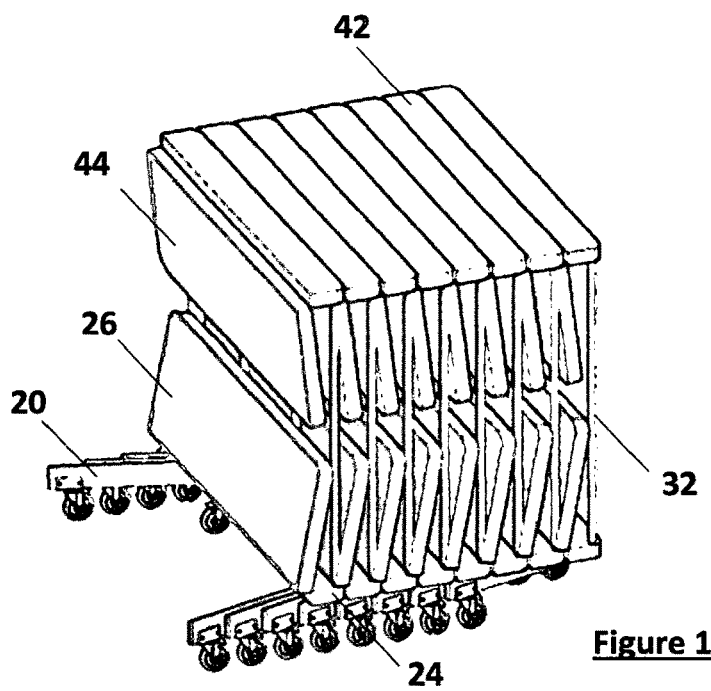
Figure 16:
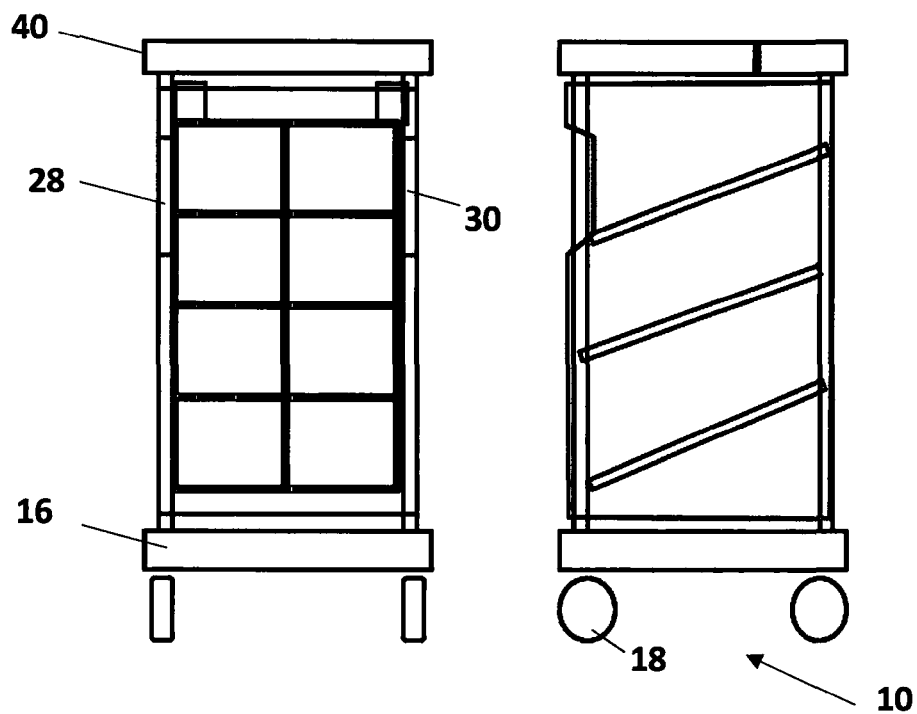
Figure 17:
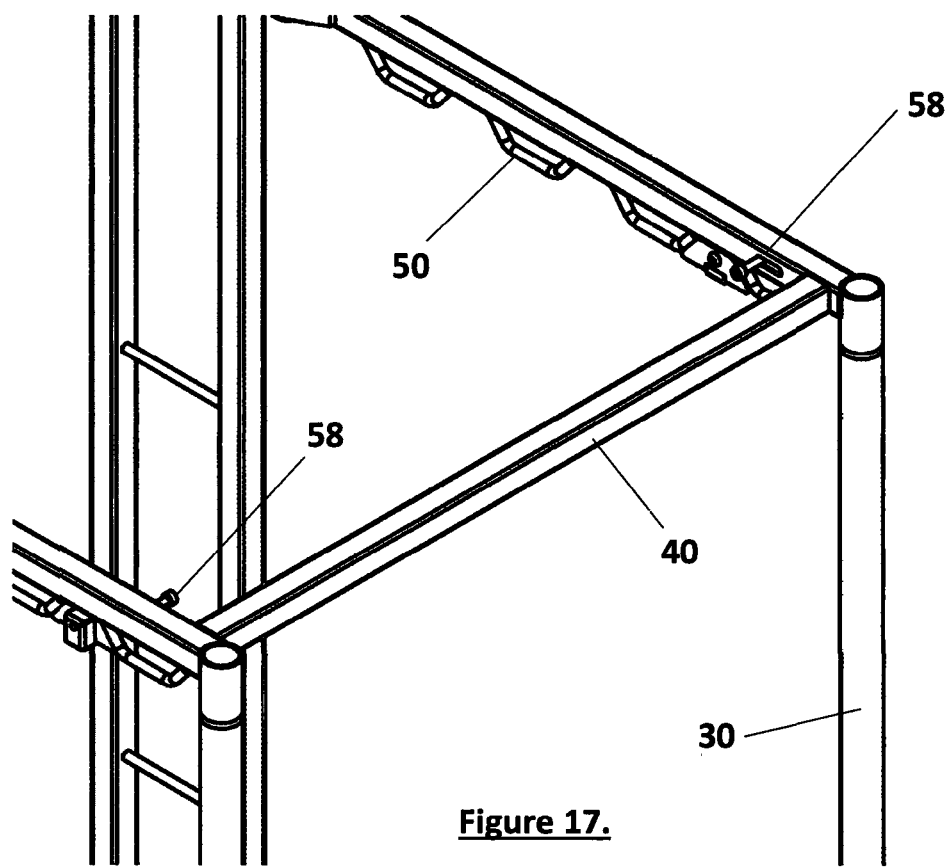

FIG. 3 includes front and rear views of schematic representations of a second embodiment of the present invention;

FIG. 4 is a plan view of a portion of the apparatus of FIG. 3;

FIG. 5 is a schematic plan view of the second embodiment in FIG. 3 in use;

FIG. 6 is a schematic representation of the operation of the embodiment in FIG. 3;

FIG. 7 is a view of a portion of the trolley of FIG. 1, together with similar components, demonstrating a storage condition;

FIGS. 8 to 11 show a third embodiment of the present invention with FIG. 9 showing the trolley in a working condition, FIG. 10 showing the trolley in a storage condition, FIG. 11 showing an intermediate position between the working and storage conditions and FIG. 8 showing several of these trolleys in a storage condition and nested together;

FIG. 12 is a perspective view of a fourth embodiment of the present invention, which is very closely related to the third embodiment;

FIGS. 13 to 15 show a fifth embodiment of the present invention with FIG. 13 showing front, plan and side views of the trolley in a storage condition, FIG. 14 showing a side view of the trolley in use and FIG. 15 showing several trolleys in storage conditions nested together;

FIG. 16 is a schematic representation of a sixth embodiment based on the second embodiment of the present invention; and FIG. 17 is a close-up view of a portion of the apparatus of FIG. 1.

Figure 2:
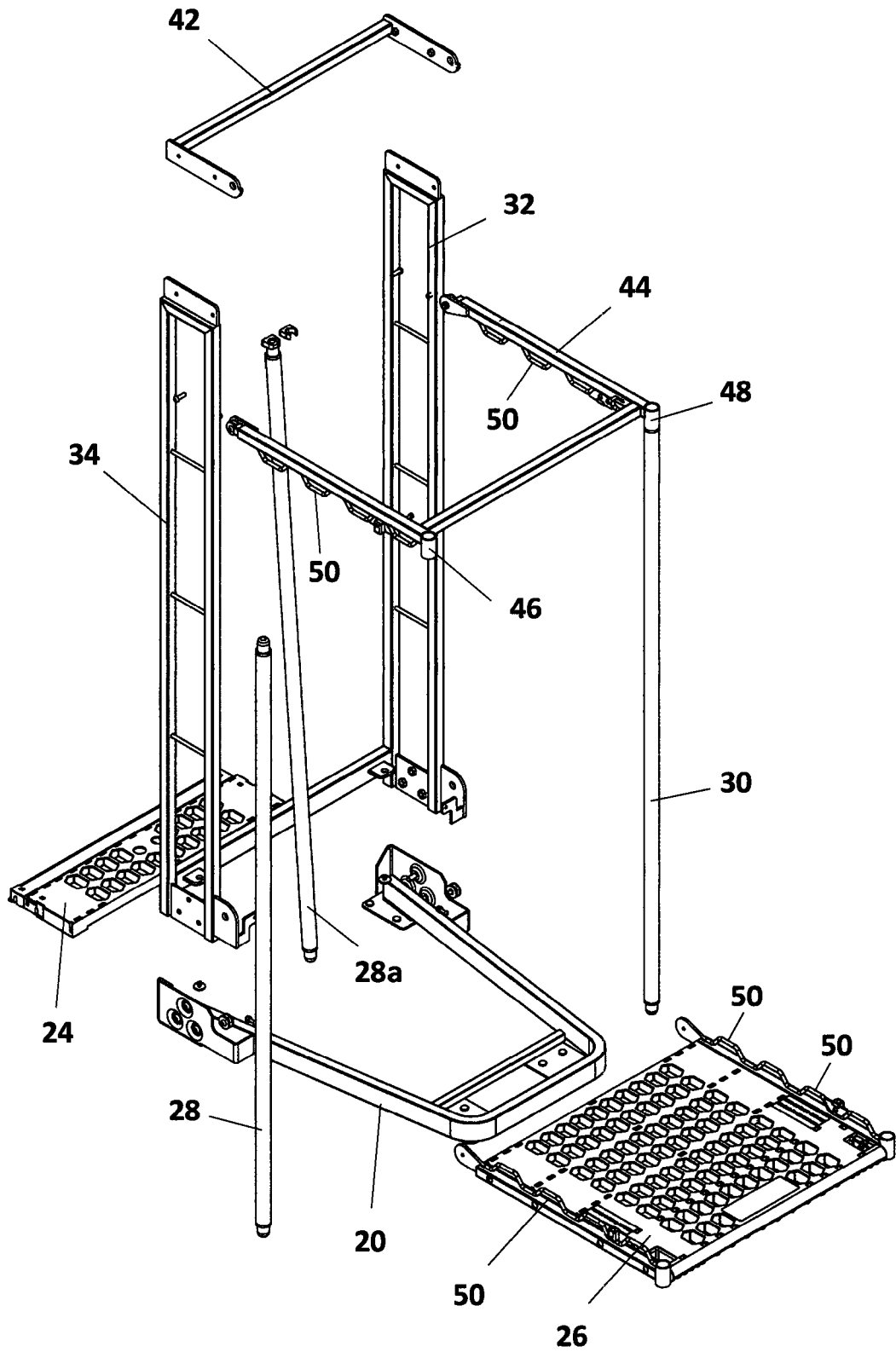
FIG. 2 is an exploded view of the apparatus of FIG. 1.

A trolley 10 is shown in seven different embodiments in the figures. A first embodiment is shown in FIGS. 1, 2 and 7. The second embodiment is shown in FIGS. 3 to 6. A third embodiment is shown in FIGS. 8 to 11 and a closely related fourth embodiment is shown in FIG. 12. A fifth and larger version of the invention is shown in FIGS. 13 to 15 and a sixth embodiment, very closely related to the second embodiment, is shown in FIG. 8. FIG. 9 is a close-up of a portion of FIG. 1 but is used to illustrate a further embodiment.

The trolley or roll cage 10 includes a body 12 and a flexible member 14. FIG. 1 illustrates an example of the body 12 of the first embodiment of the invention, and FIG. 4 illustrates a flexible member 14 of the second embodiment of the present invention. This flexible member 14 is a type which can be used in the embodiment shown in FIGS. 1 and 2 although the exact flexible member for the first embodiment is not shown.

Referring to FIGS. 1 and 2, the body 12 includes a base 16 to which wheels 18 are attached. The base 16 has a base frame 20 to which the castor type wheels 18 are attached. Also attached to the base frame 20 is a base platform 22 which is formed in two parts that can pivot relative to one another. A fixed base platform 24 is fixed to the base frame 20, whereas the foldable base platform 26 is pivotally attached to the base frame 20. As can be seen in FIG. 1, a plurality of connectors, in the form of poles 28, 30, 32 and 34, are attached to the base 16. The poles 28 and 30 are removable and attached to the base in a pair of recesses, in the form of receiving cups 36 and 38, which are formed in the corners of the foldable base platform 26. It should be noted that an additional pole 28a has been included in FIGS. 1 and 2 to illustrate a storage location of the pole 28 when the trolley 10 is in a storage condition. The poles 32 and 34 are formed as frames with pairs of elongate members, the same heights as the poles 28 and 30, joined together by connectors. These poles 32 and 34 are fixed to the base 16, and in particular to the base frame 20 by any suitable fixing means and in this example, by bolting them together. Other fixing means, including but not limited to welding, could also be used.

Also forming part of the body 12 is a frame 40 which is located above the base 16 and is connected to the base via the poles, 28, 30, 32 and 34. Like the base platform 22, the frame 40 is formed in two parts, with a fixed frame portion 42 fixedly attached to the poles 32 and 34 and a foldable frame portion 44 pivotally attached to the fixed frame portion 42. Further receiving cups 46 and 48 are formed in the corners of the foldable frame portion distal of the fixed frame portion 42 and these receiving cups engage the other ends of the poles 28 and 30 from those received in the receiving cups 36 and 38. As a result, the receiving cups 46 and 48 are located in use in the operating condition directly above the receiving cups 36 and 38.

Located along opposing edges of the base 16 and frame 40, and specifically along opposing edges of the foldable base platform 26 and the foldable frame portion 44 are tensioning loops 50. In the embodiment shown in FIGS. 1 and 2 four such tensioning loops 50 are provided on each of the edges of the foldable base platform 26 and the foldable frame portion 44 that are located between the poles 28 and 34 and between the poles 30 and 32. These tensioning loops 50 together form pairs located one directly above the other.

Referring to FIGS. 3 and 4, a second embodiment of the present invention is a trolley 10 which has a base 16, wheels 18 and a frame 40. The poles 28, 30, 32 and 34 are all removably connected to the base 16 and frame 40 by insertion into receiving cups 52. Detail of the ends of the poles, 28, 30, 32 and 34 are illustrated in FIG. 6 which show that a cam surface, in the form of a conical end surface 54, is provided on the ends of each of the poles.

The flexible member 14 is provided in the form of a sheet material. This sheet material is a reinforced tarpaulin material, which is commonly used in vehicle construction such as curtain sided lorries, although other materials, whether man made or natural fibre, may be used. This material can be easily printed onto and can be reinforced with metallic fibres, making it extremely difficult to cut or damage. The sheet material 14 is formed with sleeves into which the poles 28, 30, 32 and 34 are located and typically fixed so that the poles and sheet material cannot be separated. Gaps 56 are left in the end sleeves which receive the poles 32 and 34, thereby exposing the poles and allowing them to be used as gripping handles for moving the trolley.

Operation of the trolley 10 will now be described initially in relation to the first embodiment, shown in FIGS. 1 and 2, describing construction of the body 12. The castor wheels 18 are attached to the base frame 20 along with the frame type poles 32 and 34. The fixed base platform 24 fits between the bottoms of the poles 32 and 34 and the foldable base platform 26 is pivotally attached to the bottom of the frame type poles 28 and 30 allowing it to move between the working condition shown in FIG. 1 to a storage condition. That storage condition is with the foldable base platform 26 having rotated through a little over 90° to rest against the poles 32 and 34. The frame 40 is located directly above the base 16 with the fixed frame portion 42 fixed to the top of the frame type poles 32 and 34 and the foldable frame portion being movable from the working condition, shown in FIG. 1 to a storage condition. That storage condition requires the pivoting of the foldable frame portion 44 through 90° downwards so as to engage the poles 32 and 34.

The other components which form the body 12 are the removable poles 28 and 30 with opposing ends of the poles engaging the receiving cups 36 and 46 and 38 and 48. The poles 28 and 30 are removable and the frame and base platform foldable in order to allow the trolleys 10 to be stacked or nested in a manner which is familiar to persons operating roll cages. This facilitates compact arrangements of the empty trolleys to ensure efficient transportation. Because the poles 28 and 30 can be removed it is important to lock the poles into place to ensure the structural integrity of the trolley. In the embodiment shown in FIGS. 1 and 2 this is achieved using the flexible member. There are a number of different flexible members and ways in which the flexible member can be used to apply tension to the body 12 and ensure the structural integrity of the trolley 10. In doing so, the various components previously described are locked together and it is this locking and the tension applied to the body that prevents the rattling of the components.

One way to achieve that is to use the tarpaulin type sheet material 14 shown in FIG. 4 and there are various configurations of this sheet material which can be used. The arrangement of the poles, 28, 30, 32 and 34, along with the base 16 and frame 40 create a cuboid. The four vertical and rectangular faces of this cuboid can be described as a front face (F) between the poles 28 and 30, a back face (B) between the poles 32 and 34, a left side face (LS) between the poles 28 and 34 and a right side face (RS) between the poles 30 and 32. A fixed and immovable sheet can be attached to the body 12 to cover the back face (B) with the tarpaulin material fixed to the poles 32 and 34 and to the rear edges of the fixed base platform 24 of the base 16 and the fixed frame portion 42 of the frame 40.

Two further sheets of the tarpaulin material 14 can be used to cover the left side and right side faces (LS and RS) with these sheets being attached to the poles 28 and 34 and 30 and 32 respectively. These sheets are not fixed to the base 16 and frame 40 permanently but can be attached to them using any suitable fixing to engage the tensioning loops 50. For example, a tensioning clamp or latching clamp can be fixed at one or more locations on the top and bottom edges of the side sheet materials and these latching clamps can hook into and lock to the tensioning loops 50. Alternatively, short ratchet straps can be provided which loop through the tensioning loops 50 and allow variable tension to be applied between opposing pairs of the tensioning loops. It would normally only be necessary to provide the ratchet straps or latching clamps at the top or the bottom of the sheet material with the other end being provided with hooks which simply hook into the tensioning loops 50. In this embodiment, the components of the body, between which the flexible member or sheet material create tension are the frame 40 and the base 16.

The above described examples provide a trolley or roll cage 10 with three covered sides (LS, B and RS and an open front face (F). This trolley can be used in a way that is familiar to persons skilled in the art of roll cages.

Turning to the second embodiment of the present invention shown in FIGS. 3 and 4, in this embodiment, the sheet material 14 and poles 28, 30, 32 and 34 are connected together as a single component. They are preferably, but not necessarily, separable from the base 16 and frame 40 and these components join together by the insertion of the pole ends into the receiving cups 52. The tension in the flexible member 14 is created by the insertion of the poles, 28, 30, 32 and 34 into the receiving cups 52. In particular, it is the use of the conical cam surfaces 54 which pull the sheet material 14 taught as the conical cam surfaces 54 are pushed into the receiving cups 52. This is illustrated in FIG. 6 which shows, in the left-hand image, the pole 28 not inserted into the receiving cup with the sheet material 14 pulling the pole in the direction D1. In the right-hand image, the pole 28 is inserted into the receiving cup 52 and the sheet material 14 is pulled taut, thereby applying a tensioning force in the direction D2.

In this invention it is the application of the tension applied by the flexible member or sheet material 14 between components of the body which creates the rigid structural integrity of the trolley 10.

In the second embodiment the components of the base to which tension is applied by the flexible member or sheet material 14 are adjacent pairs of the poles, 28, 30, 32 and 34.

As can be seen in FIGS. 3 and 4 the three portions of the sheet material 14 create a trolley with covered faces on the left side (LS), the rear side (B), the right hand side (RS) and an open front face.

Referring to FIG. 5, which is split into four images labelled 5a, 5b, 5c and 5d, these figures show a schematic plan view of the process of transferring the trolley from a working to a storage condition. This description is applicable to both the first and second embodiments described above. FIG. 5a shows the trolley 10 in a working condition, as seen in FIG. 3, although with the frame 40 removed (this is shown in FIG. 5d). In order to move to the stored condition, shown in 5b, the pole 30 is removed from its receiving cup 52 and inserted into another receiving cup, adjacent the pole, 34, close to the rear face (B). Similarly, the pole 28 is removed from its receiving cup 52 and is moved to a further receiving cup adjacent the pole 32 also close to the rear face (B). As a result, the right and left sides (LS) and (RS) have been moved and folded to adjacent the rear surface (B). The reverse of this process, as shown in FIG. 5c with the frame 40 being replaced in FIG. 5d In the embodiment shown in FIG. 1 when the poles have been located adjacent the back face (B), in the location indicated by the pole 28a, the foldable base platform 26 can be folded up and the foldable frame portion 44 folded down. Once this position is created the trolley is contained substantially between the frame type poles 32 and 34 with only the front portion of the base frame 20, and its front wheels 18, extending forwards. This base frame 20 has an A-frame construction familiar to persons skilled in this art to allow multiple trolleys to nest together and be rolled and transported as a train of trolleys. This nesting is illustrated in FIG. 7, which shows a pair of the base frames 20, with their wheels 18, nested together in the formation used in the fully assembled trolleys 10 when in a storage condition.

Referring to FIGS. 8 to 11, a third embodiment of the present invention, somewhat similar to the first embodiment, is illustrated. The body 12 of the trolley 10 has a base frame 20 on which a base platform 22 sits. The four poles, 28, 30, 32 and 34 extend up from the base platform 22 and engage the frame 40, to create the working condition shown in FIG. 9. The storage condition is shown in FIG. 10 with an intermediate condition illustrated in FIG. 11. To move from the working condition to the storage condition, the poles 28 and 30 are removed and disengaged from the receiving cups in the foldable base platform and foldable frame portions 26 and 44. This allows the foldable base platform 26 and fixed frame portion 42 to pivot through 90° with the foldable base platform 26 sitting behind the foldable frame portion 44 in the storage condition. As can be seen in FIG. 10, the poles 28 and 30 are fixed into further receiving cups in the fixed base platform 24 and fixed frame portion 42 for convenient storage and to limit the movement of the foldable base platform 26 and foldable frame portion 44. Once in the storage condition, multiple trolleys can be nested together as shown in FIG. 8.

A very similar embodiment to that just described is illustrated in FIG. 12. This version is constructed for carrying heavier loads with the poles being more substantial than those previously described (only poll 32 is visible in FIG. 12). The frame 40 and base platform 22 are formed from multiple aluminium slats which are laid parallel to each other and fixed within a frame to create a platform which is capable of carrying significant weights.

Referring to FIGS. 13 to 15, a fifth embodiment of the present invention is shown. The most significant difference between this fifth embodiment and the third and fourth embodiments just described is the width of the trolley, that is approximately the distance between the pairs of poles 28 and 30 and between poles 32 and 34. These trolleys, as illustrated in FIG. 14, are designed for use with larger articles such as furniture and as which the other trolleys can support and carry articles on the frame 40. In order to provide additional structural support over this larger width, additional poles 32 and 34 are provided, as illustrated in FIG. 13.

It will be appreciated by persons skilled in the art that the above embodiments have been described by way of example only and not in any limitative sense, and that various alterations and modifications are possible without departure from the scope of the protection which is defined by the appended claims. For example, in FIG. 16, an alternative configuration of the second embodiment is shown in which the flexible member 14 is formed with integral shelves 58. As a result, the sheet material is the outside and the shelves are formed internally. These can be removable solid shelves or can be also made from flexible sheet material such as wire reinforced tarpaulin to provide flexible shelving for lightweight products such as bread. Alternatively, rigid shelving could be provided which fixes to the body 12.

There are various other configurations of flexible member which can be used in conjunction with the present invention. For example, longer ratchet straps can be used between the tensioning loops 52 create a trolley which has the base 16 and frame 40 pretension together using these ratchet straps, but without the sheet material and as a result, it is the ratchet straps which provide the flexible member 14 (such as the example shown in FIGS. 13 to 15). Once the ratchet straps are in place, the structural integrity of the body 12 has been created and other means for constraining items within the trolley can be provided. For example, a bag can be fitted into the top of the open frame 40 thereby allowing items to be placed into the bag. This can be used for placing rubbish or items to be recycled, can be used as a laundry bag or can be used for transportation of liquids, if a suitably strong and leakproof bag is provided. As a further alternative, the bag may be provided with hooks which attach to the tensioning loops 50 in the frame 40 and provided with some tensioning means, such as a tensioning clamp or tensioning latch at the bottom of the bag which attaches to the tensioning loops 50 in the base 16.

The previous embodiments described in detail at the start of this description disclosed a three sided trolley with an open front. Other combinations of sheet material can be provided to cover more or less of the faces (F, B, LS and RS). As a further alternative, the pair of poles at the rear of the trolley 10, that is the poles 32 and 34, could be replaced with a single rigid sheet material which is connected to the base 16 and the frame 14, thereby leaving only the poles 28 and 30. A further development on from that rigid back surface is the removal of the poles 28 and 30 and their replacement with other locking members which ensure that the frame 40 is held in an upright condition. For example, triangular bracing arms between the frame and the rigid rear wall would ensure that the frame 40 remains in the working condition and would allow tension to be created between the base 16 and the frame 40 using the flexible member 14.

In a further alternative embodiment, the use of the flexible members to provide the locking tension between the frame, base and poles may be removed. Instead, latching devices, such as the sliding latch is 58 shown in FIG. 17 can be provided to lock the poles to the frame and base. In order to prevent the components rattling it is also advantageous to produce at least some of the components from a plastic material. For example, the frame and base may be formed from metal components with the poles formed from plastic. In the example shown in FIG. 17, the tensioning loops 50 are also provided and the latches illustrated therein are used in addition to the tensioning provided from the flexible member. However, the latches can work independently and as long as they prevent the rattling movement of the frame or base relative to the poles, then a roll cage which is able to move very quietly can be provided.

The trolleys 10 can be provided with a power source, such as a battery, and drive means to the wheels to assist in the movement of the trolley.

The invention claimed is:
1. A trolley comprising:
a base having a plurality of wheels attached thereto;
a frame in use located above said base;
at least one connector in use joining said frame to said base; and at least one flexible member attached to and connecting a plurality of said connectors and thereby pulling said frame and said base into engagement with said connectors.

2. A trolley according to claim 1 wherein said flexible member comprises at least one sheet material in use extending between adjacent pairs of said connectors.

3. A trolley according to claim 1 wherein said at least one flexible member wraps around an exterior of the plurality of said connectors, and wherein said at least one flexible member is maintained taut so as to apply a tensioning force between adjacent pairs of the plurality of said connectors.

4. A trolley according to claim 1 further comprising a clamp for fixing said flexible member to said base and said frame thereby creating tension between said base and said frame via said flexible member.

5. A trolley according to claim 4 wherein said clamp comprises a tensioning clamp.

6. A trolley according to claim 4 wherein said flexible member and said clamp comprise a ratchet strap.

7. A trolley according to claim 1 wherein said at least one connector comprises at least one pole.

8. A trolley according to claim 1 wherein at least one connector is fixed to said base and said frame.

9. A trolley according to claim 1 wherein at least one connector is removably connected in use to said base and said frame.

10. A trolley according to claim 1 wherein the plurality of said connectors comprises a pair of fixed connectors and a pair of removable connectors.

11. A trolley according to claim 1 wherein said at least one flexible member extends between three pairs of adjacent connectors of the plurality of said connectors to cover a back face, a left side face, and a right side face of the trolley while leaving a front face of the trolley open.

12. A trolley according to claim 1 wherein said frame comprises a first foldable portion pivotable through substantially 90° from a working condition to a storage condition.

13. A trolley according to claim 12 wherein said frame further comprises a first fixed portion attached to said connector with said first foldable portion being capable of pivoting relative to said fixed portion.

14. A trolley according to claim 13 wherein said base comprises a second foldable portion pivotable through substantially 90° from a working condition to a storage condition.

15. A trolley according to claim 14 wherein said base further comprises a second fixed portion attached to said connector with said second foldable portion being capable of pivoting relative to said fixed portion.

16. A trolley according to claim 1 wherein a connection between at least one connector and at least one of said base and said frame comprises a cam surface which causes said connector to move in a direction when said connector and said base or frame are brought together to apply tension to said flexible member.

17. A trolley according to claim 16 wherein said cam surface comprises an at least partially conical surface formed on a surface of said connector.

18. A trolley comprising:
a base having a plurality of wheels attached thereto;
a frame in use located above said base;
a plurality of connectors coupled to said frame and said base to join said frame to said base; and
at least one flexible member attached to said plurality of connectors, wherein said at least one flexible member is pulled taut by coupling the plurality of connectors to said frame and said base so that the flexible member applies tension between the plurality of connectors to provide the trolley with structural integrity.

19. The trolley according to claim 18 wherein the plurality of connectors comprises at least one pair of connectors that are removably coupled to the frame and the base, and wherein the tension applied by the at least one flexible member locks the at least one pair of connectors into place.

20. A trolley comprising:
a base having a plurality of wheels attached thereto;
a frame located above said base;
a plurality of poles coupled to the base and the frame, the plurality of poles having an outer surface comprising an interior surface portion that faces an interior of the trolley and an exterior surface portion that faces an exterior of the trolley; and
at least one flexible member extending around the exterior surface portions of the plurality of poles, and wherein engagement of the plurality of poles to the base and the frame pulls the at least one flexible member taut so that the at least one flexible member creates tension between said base, said frame, and said poles.

\* \* \* \* \*